3,578,612
POLYURETHANE FOAMS BASED ON DIMER FATTY ACID POLYALKANOLAMIDES

Christian Burba, Lunen, Manfred Drawert, Werne, and Eugen Griebsch, Unna, Germany, assignors to Schering A.G., Berlin and Bergkamen, Germany
No Drawing. Continuation-in-part of applications Ser. No. 700,001, Jan. 24, 1968, and Ser. No. 743,958, July 11, 1968. This application July 24, 1969, Ser. No. 844,650
Claims priority, application Germany, Jan. 31, 1967, P 17 95 024.02
Int. Cl. C08g 22/08, 22/46, 51/72
U.S. Cl. 260—2.5                       4 Claims

ABSTRACT OF THE DISCLOSURE

Foams of a synthetic amide group-containing polyurethane resin formed by reacting and foaming a polymeric fatty acid alkanolamide, or an alkoxylated polymeric fatty acid alkanolamide, with a polyisocyanate. The polymeric fatty acid alkanolamide is made typically by condensing dimerized fatty acid with mono- or dialkanolamines. The foams have excellent resistance to hydrolysis.

---

This application is a continuation-in-part of copending applications Ser. No. 700,001, filed Jan. 24, 1968 (now abandoned), and Ser. No. 743,958, filed July 11, 1968 (now abandoned).

The present invention relates to foams of a synthetic polyurethane resin comprising amide groups and, optionally, urea groups, and to methods of making the same.

A large number of polyhydroxy compounds have already been described as useful for the preparation of polyurethane foams, among them high molecular weight condensation products, particularly polyesters and polyamides containing free hydroxyl groups. The disadvantage of these condensation products lies in their susceptibility to hydrolysis. Also, the materials are not suitable for the preparation of hard foams because of their low hydroxy number.

Polyurethane foams containing amide groups are also known in the art. Until now, however, these foams have been obtained only by the reaction of polyols containing free carboxy groups with organic polyisocyanates. In such a process, the slow rate of reaction between carboxy groups and isocyanate groups is very disadvantageous. Also, the carbon dioxide produced by the reaction degrades the thermal insulation exhibited by the foam and its impermeability to water vapor diffusion.

According to the present invention, alkanolamide condensation products containing free hydroxy groups are formed between polymeric fatty acids and alkanolamines and are reacted with polyisocyanates in the presence of conventional foaming agents and additives to form foams of a synthetic polyurethane resin containing amide groups and, optionally, urea groups. In a further embodiment of the invention, the alkanolamides are alkoxylated prior to reaction with a polyisocyanate.

In addition to free hydroxy groups, the alkanolamide condensation products used according to the invention contain amide groups almost exclusively. Thus, in the reaction with organic polyisocyanates, $CO_2$ is not generated and foaming is accomplished by introducing conventional foaming agents such as the low-boiling fluorochloroalkanes as foaming agents. In this manner, any disadvantages inherent in $CO_2$ evolution as described above can be completely avoided. However, water may be added to the reaction mixture, alone or in combination with other foaming agents, to foam the product with carbon dioxide if desired.

A further advantage of the foamed products of the present invention is their significantly improved resistance to hydrolysis. Further, it is surprising that relatively tough and flexible foams are formed according to the invention even when difunctional hydroxy compounds are employed and despite the relatively low hydroxy numbers involved when monoalkanolamines are used. Conventionally, polyhydroxy components having high hydroxy number and high hydroxy functionality are employed for the preparation of hard polyurethane foams.

Finally, the preparation of hard polyurethane foams according to the invention with only a small consumption of polyisocyanate, in view of the relatively low hydroxy number of the polyol component when stoichiometric reactions and monoalkanolamines are involved, presents an important economic advantage.

The polyurethane foams of the present invention are tough, hard products. Even when foaming is accomplished with carbon dioxide by introducing water as the foaming agent, no cracking due to the presence of the urea groups formed thereby in the resin is detectable. If alkanolamides derived from dialkanolamines are used according to the invention, they contain predominantly di-substituted amide groups in addition to free hydroxy groups. Although there is thus no possibility for the formation of hydrogen bonds, nevertheless hard polyurethane foams are formed. Even when the conventional fluorochloroalkanes are used alone as foaming agents, that is without carbon dioxide generated by water addition, hard polyurethane foamed bodies with good pressure resistance can be formed.

The polymeric polycarboxylic fatty acids or fatty acid esters, particularly the esters of monohydric alcohols having up to four carbon atoms, used in the preparation of the alkanolamides are preferably obtained by the homopolymerization of mono- and/or poly-unsaturated fatty acids or their esters, or by their copolymerization with other monomers. The homopolymerization of saturated fatty acids can be carried out at elevated temperatures with peroxide catalysts such as di-t-butyl-peroxide, for example. The straight chain and branch-chain acids such as caprylic, pelargonic, capric, lauric, myristic, palmitic, isopalmitic, stearic, arachidic, behenic, and lignoceric acids are suitable saturated fatty acids. However, this process is of little interest because of the small yield.

The polymerization of ethylenically unsaturated fatty acids is much more common. This can be done with or without catalysts, but uncatalyzed polymerization requires higher temperatures. Suitable catalysts are acid or alkaline clays, di-t-butyl-peroxide, boron trifluoride and other Lewis acids, anthraquinone, sulfur trioxide, and the like. Homopolymerization can be carried out thermally, preferably in the presence of catalysts. Polymerization processes and products of this type are disclosed in the following U.S. patents, incorporated herein by reference: 2,482,761; 2,731,481; 2,793,219; 2,793,220; 2,955,121; 3,059,003; 3,076,003; 3,100,784; and 3,157,681. In general, the polymerization preferably involves fatty acids having 10 to 22 carbon atoms derived from animal, vegetable, mineral, or synthetic sources. Homopolymeric fatty acids obtained in this manner predominantly comprise dimeric fatty acids together with varying amounts of trimeric and monomeric fatty acids.

The acetylenically unsaturated fatty acids, which can be homopolymerized in the absence of catalysts because of their higher reactivity, seldom occur in nature and are expensive to synthesize. For this reason they are economically less interesting. A number of acetylenically unsaturated fatty acids, either straight chain or branch chain, mono-unsaturated or poly-unsaturated, can be used for the preparation of polymeric fatty acids. For example, 6-octadecyn, 9-octadecyn, 13-docosyn, and 17-octadecen-9,11-diyn acids can be mentioned.

The preparation of polymeric fatty acids by copolymerization can take place by other methods, particularly in the presence of catalysts. U.S. Patent 3,271,432 incorporated herein be reference teaches the ionic copolymerization of fatty acids and their esters with aromatic vinyl compounds. Conjugated unsaturated fatty acids or their esters are preferred for this purpose. As co-monomers for the copolymerization of fatty acids, styrene, coumarone, vinyl toluene, α-methyl styrene, indene, and the like can be employed.

The polymeric fatty acids obtained by the methods described above may be more or less completely saturated by hydrogenation, if desired.

The term "polymeric fatty acid" as used in this specification and claims thus includes homoploymeric fatty acids as well as copolymeric fatty acids, i.e. polycarboxylic acids in which two or more fatty acid molecules are directly linked, or are joined through co-components as bridging members, or are bound in some other fashion with co-components, as well as mixtures of such polymeric acids including minor amounts of monomeric fatty acids.

Polymeric fatty acids having the following composition are particularly suitable for the preparation of polyols by reaction with dialkanolamines:

|  | Percent |
|---|---|
| Higher natural monomeric fatty acids | Up to 50. |
| Dimeric fatty acids | 10–90. |
| Trimeric and polymeric fatty acids | Up to 60. |

Monoalkanolamines having an alkylene radical containing 2 to 10 carbon atoms are suitably reacted with the acids. The alkylene radicals may be branched and may be interrupted by oxygen atoms. Exemplary materials are monoethanolamine, monopropanolamine, monoisopropanolamine, and also monoalkanolamines prepared by the monocyanoethylation of glycols with subsequent hydrogenation, for example 4-oxa-octanolamine which is derivable in the fashion described from butylene glycol.

The alkanolamides used in the present invention can be prepared from polymeric fatty acids and such monoalkanolamines either by way of a melt condensation at temperatures between 160° C. and 190° C., or by condensation with azeotropic removal of the water of reaction, as known to those skilled in the art. In place of the free polymeric fatty acids, their esters, particularly those esters of monohydric alcohols having 1 to 4 carbon atoms, can be employed. Because of the properties desired in the foams, the content of amino-esters present in the alkanolamide reactant derived from a monoalkanolamine (and thus also the number of unreated amino groups), as well as the number of oxazoline rings, is suitably kept as low as possible. This can be achieved by a suitable choice of reaction temperature and reaction time in the preparation of the alkanolamides. It is recommended that a condensation temperature between 170° C. and 180° C. be maintained, after beginning of the cleavage of water, until the acid number of the reaction mixture is at most 2.5. (Subsequently in vacuum it decreases to a value under 1.) It is important to cut off the reaction at this time since otherwise the formation of oxazoline rings is favored. If one starts from fatty acid esters and condenses using an azeotrope, it is recommended that alkaline catalysts such as the bicarbonates or hydroxides of the alkali metals (cf. Austrain Pat. 225,683) be used.

The dialkanolamines preferred for use in preparing the polyol component according to the present invention are those containing primary hydroxyl groups and an alkylene group having 2 to 4 carbon atoms, for example diethanolamine or di-n-propanolamine. If diisopropanolamine is employed, the addition of an accelerator becomes necessary for increasing the reactivity of the polyol according to the invention.

Polyol compounds comprising bis-, tetrakis-, hexakis-, and/or polykis-(hydroxyalkyl) compounds, depending on the composition of the polymeric fatty acids used, are perpared from dialkanolamines and polymeric fatty acids or their amide-forming derivatives according to processes known in the prior art, for example U.S. Pat. 2,537,493. According to the present invention, the molar ratio between the polymeric fatty acids and the dialkanolamines is between 1:2 and 1:4, preferably between 1:2.4 and 1:3, and the by-products formed in the condensation are not removed by washing.

Amide group-containing polyol compounds have already been recommended for the preparation of polyurethane coatings (cf. U.S. Pat. 3,267,080). However, the polyol used for this purpose was completely freed of simultaneously formed by-products by means of a washing process. A low content of tertiary nitrogene is characteristic of such purified products. The pot life, or time within which a two-component polyol/polyisocyanate system containing such a polyol can be worked, is a very important property and is decisively influenced by this washing process. The smaller the residual amine content in the polyol, the longer is the pot life.

However, if one attempts to employ the polyols taught in U.S. Pat. 3,267,080 in the preparation of foamed polyurethane materials, it is found that they are not usable for this purpose without the addition of accelerators. On the other hand, if condensation products prepared from polymeric fatty acids and an excess of dialkanolamines are used without removal of the by-products formed during the condensation, as in the present invention, it is surprisingly found that this kind of polyol can be worked up with polyisocyanates to form foams having advantageous properties without the addition of catalysts.

The catalytically active contents of the polyols employed according to the present invention are apparently tertiary amino compounds derived from the dialkanolamines employed in excess. It could not be foreseen that the tertiary amine by-products of the condensation would have such an advantageous effect on the foaming as compared with other volatile amine catalysts conventionally used for preparing polyurthane foams, such as dimethyl piperazine, N-methyl morpholine, etc. The by-products are, additionally, relatively involatile and thus have an advantage from a physiological viewpoint over the conventional amine accelerators.

In contrast to the reaction products of monoalkanolamines with polymeric fatty acids, the reaction products of dialkanolamines and polymeric fatty acids have a higher hydroxy number, advantageous for the preparation of polyurethane foam materials, with simultaneous doubling of the functionality of the polyol component. The excellent resistance to hydrolysis characteristic of foams derived from monoalkanolamines is found also in the foams derived from dialkanolamines.

For the preparation of foams by machine, it is particularly desirable that the polyols employed be of low viscosity. According to the present invention, it has been found that the viscosity of fatty acid amides of monoalkanolamides can be decreased significantly by alkoxylation, e.g. by reaction of some or all of the hydroxy groups with ethylene oxide or propylene oxide.

As known in the art, such alkoxylation reactions are suitably carried out at elevated temperatures, preferably at 100° C.–200° C., and at a pressure between about 1 and 5 atmospheres by gradual addition of ethylene or propylene oxide to the polyol. Alkaline catalysts such as NaOH, KOH, alcoholates, or metallic sodium can be employed in the concentration of 0.1 to 1.0%, but are often omitted to obviate removal problems.

A considerable decrease in viscosity is obtained when approximately 50 percent of the available hydroxy groups are alkoxylated. A lesser degree of alkoxylation results in smaller decreases in the viscosity value. A greater degree of alkoxylation, including complete alkoxylation, further decreases viscosity, but to a diminished extent which may not always justify the cost of the additional reagent.

The polyisocyanates suitable for the preparation of the polyurethane foamed products according to the invention have two or more isocyanate groups and preferably are aromatic or araliphatic materials of a type heretofore used in the art for foaming polyurethanes. Exemplary substances are: p,p-diisocyanato-diphenylmethane; polymethylene - polyphenylisocyanate; 4,4'-diisocyanato-3,3'-dimethyl-diphenylmethane; 2,4-toluene diisocyanate; 2,6-toluene diisocyanate; m-phenylene diisocyanate; p-phenylene diisocyanate; 1,5-naphthylene diisocyanate; and diphenyl-dimethylmethane-diisocyanate. Mixtures of different polyisocyanates can also be used.

Preparation of polyurethane foams according to the present invention involves reaction of the hydroxy component and the isocyanato component, usually in substantially stoichiometric amounts.

Because of the good compatibility of the hydroxy component and isocyanato component of the present invention with corresponding commercially available components, it is possible to vary the properties of the polyurethane foams widely by blending corresponding commercial materials with the components of the invention. Polyfunctional cross-linking agents, such as N,N,N',N'-tetrakis-(2-hydroxypropyl)-ethylene diamine, are particularly advantageous components of such mixtures. The polyethers usually used for preparing hard foams can also be employed, and foams may be prepared from mixtures of polyols derived from monoalkanolamines and those derived from dialkanolamines.

Emulsifiers, foam stabilizers, and catalysts are principally employed as additives. Further additives such as fillers and dyes, for example chalk, carbon black, etc. can be added when necessary, as can anti-oxidizers, fungicides, fire-retardation agents, and the like. Carbon dioxide formed by the addition of water to the reaction mixture, gaseous fluorochloroalkanes, or mixtures of the two can be used as foaming agents.

The preparation of the foams is preferably carried out according to the so-called "one-shot process" by combining the polyol component, admixed with the foaming agent and any additives, with the polyisocyanate component in molds for foaming. Prefoaming, (frothing) can also be employed.

Tertiary amines, divalent metal salts, metal organic compounds such as organic tin compounds, and mixtures thereof are exemplary of suitable catalysts which may be added in small amounts if activation of the foam-forming process is desired.

To stabilize the polyurethane foams during foaming, it is advantageous to include foam stabilizers comprising silicon. In batches foamed with carbon dioxide, it is advisable to include emulsifiers.

EXAMPLES 1–12

A better understanding of the present invention and of its many advantages will be had by referring to following Table I summarizing specific Examples 1–12, given by way of illustration, in which foams are prepared from polyols derived from monoalkanolamines.

The hydroxy compounds and auxiliary agents and additives shown in Table I below were first thoroughly mixed. After stirring in the isocyanate, the reaction begins and the mixtures were quickly poured into an open mold.

In the table the letter symbols having the following significance:

(a) alkanolamide prepared from technical grade dimeric fatty acid and ethanolamine, hydroxy number=154;
(b) alkanolamide prepared from technical grade dimeric fatty acid and 4-oxa-octanolamine, hydroxy number=133;
(c) alkanolamide prepared from technical grade styrenized fatty acid and ethanolamine, hydroxy number=139;
(d) alkanolamide prepared from dimeric fatty acid and ethanolamine, hydroxy number=160;
(e) N,N,N',N'-tetrakis - (2 - hydroxypropyl) - ethylene diamine;
(f) a commercial polyether having an hydroxy number=550;
(g) trichloromonofluoromethane;
(h) N-methylmorpholine or N,N'-dimethyl piperazine;
(i) dibutyl tin dilaurate;
(j) polysilixane foam stabilizer;
(k) sodium ricinoleyl sulfonate (50 percent water content);
(l) crude 4,4'-diisocyanato-diphenylmethane;
(m) polymethylene-polyphenylisocyanate.

The technical grade dimeric fatty acid employed in (a) and (b) was polymerized tall oil fatty acid and had the following composition according to a gas chromatographic analysis: monomeric fatty acid 7% by weight; dimeric fatty acid 79% (including the intermediate between the monomer and dimer peaks); trimeric or higher polymeric fatty acids 14%. The styrenized fatty acid employed in (c) is prepared by copolymerizing styrene and tall oil fatty acid (or an ester thereof) by heating, as known in the art from U.S. Pats. 2,952,647 and 3,271,432 or Belgain Pat. 627,128, for example. The dimeric fatty acid in (d) was polymerized tall oil fatty acid and had the following composition according to a gas chromatographic analysis: monomeric fatty acid 16% by weight; dimeric fatty acid 72% (including the intermediate between the monomer and dimer peaks); trimeric or higher polymeric fatty acids 12%.

TABLE I

| Example | Alkanolamide (parts by weight) | | | | Auxiliary and additive agents (parts by weight) | | | | | | | Polyisocyanate (parts by weight) | | Density (kg./m.³) | Foaming agent |
|---|---|---|---|---|---|---|---|---|---|---|---|---|---|---|---|
| | a | b | c | d | e | f | g | h | i | j | k | l | m | | |
| 1 | 85 | | | | 15 | | 15 | 1.0 | 0.1 | 1.5 | 6 | 126 | | 34 | CO₂ and CCl₃ F. |
| 2 | 100 | | | | | | 10 | 1.5 | | 1.5 | 6 | 76 | | 33 | |
| 3 | 50 | | | | | | 50 | 10 | 1.0 | 0.1 | 1.5 | 6 | 130 | | 34 | |
| 4 | | 100 | | | | | | 10 | 1.5 | | 1.0 | 5 | 66 | | 38 | |
| 5 | 70 | | | | 30 | | | 40 | 1.0 | | 1.0 | | 91 | | 35 | CCl₃ F. |
| 6 | 100 | | | | | | | 30 | 1.5 | | 1.5 | | 34 | | 60 | |
| 7 | 100 | | | | | | | | 1.0 | 0.1 | 1.0 | 8 | 93 | | 36 | |
| 8 | 85 | | | | 15 | | | | 1.0 | | 1.5 | 8 | 120 | | 43 | |
| 9 | 85 | | | | 15 | | | | 1.0 | | 1.5 | 8 | | 131 | 46 | CO₂. |
| 10 | 85 | | | | 15 | | | | 1.0 | | 1.5 | 6 | 106 | | 51 | |
| 11 | | 100 | | | | | | | 1.0 | | 1.5 | 8 | 94 | | 33 | |
| 12 | | | | 50 | 10 | 40 | 30 | 1.0 | | 1.0 | 2 | 115 | | 36 | CO₂ and CCl₃ F. |

EXAMPLES 13–23

To prepare the foams of Examples 13–23 in which the polyols are derived from dialkanolamines, the hydroxy compounds mentioned in following Table II are first thoroughly mixed with the additives. After addition of the isocyanate, the reaction begins and the mixture is quickly poured into an open mold.

The technical grade dimeric tall oil fatty acids employed in the preparation of the polyols had the following composition as determined by chromatographic analysis:

(I)

| | |
|---|---|
| Monomeric fatty acid | 7 Percent by weight. |
| Dimeric fatty acid | 79 Percent by weight. |
| Trimeric or higher polymeric fatty acids | 14 Percent by weight. |

(II)

| | |
|---|---|
| Monomeric fatty acid | 46 Percent by weight. |
| Dimeric fatty acid | 45 Percent by weight. |
| Trimeric or higher polymeric fatty acids | 9 Percent. |

(III)

| | |
|---|---|
| Monomeric fatty acid | 34 Percent by weight. |
| Dimeric fatty acid | 20 Percent by weight. |
| Trimeric and polymeric fatty acid | 46 Percent by weight. |

In Table II, the entries have the following significance:

($a_I$)–($a_{III}$) alkanolamides prepared from diethanolamine and the fatty acids respectively identified above. The alkanolamides had the following properties:

| | Hydroxy number | Amine number | Acid number |
|---|---|---|---|
| ($a_I$) | 293 | 43 | 0.5 |
| ($a_{II}$) | 285 | 52 | 0.8 |
| ($a_{III}$) | 248 | 50 | 1.8 |

(b) bis-(2-hydroxyethyl) dimeric fatty acid amide, hydroxy number=154;
(c) N,N,N',N'-tetrakis(2-hydropropyl)ethylene diamine;
(d) a commercial polyether having an hydroxy number=550;
(e) trichloromonofluoromethane;
(f) N,N' dimethyl piperazine;
(g) foam stabilizer comprising silicone;
(h) sodium castor oil sulfonate (50 percent water content).

with stirring for one and one-half hours until condensation began. Subsequently, the water formed was distilled off over 6 hours by further heating at temperatures up to 170° C. After this time, the acid number of the reaction product was 5.5. Vacuum treatment at 18 mm. Hg followed for 10 minutes at a maximum temperature of 170° C. The alkanolamide had the following characteristics:

OH number=159
Acid number=3.5
Amine number=5.9
Viscosity=639 poises/25° C.

This alkanolamide was next reacted with 2984 grams of propylene oxide added with rapid stirring at a temperature of 150° C.–160° C. over 6 hours. The oxide included a 5% excess (142 grams) over the required calculated amount of 2842 grams. When generation of heat subsided, the material was permitted to react further for about 30 minutes. The final product was then heated for about thirty minutes in a vacuum of 18 mm. Hg at a temperature of 130° C. The monopropoxylated bisethanolamide of propylene oxide added with rapid stirring at a temfollowing characteristics:

OH number=191
Acid number=0
Amine number =24
Viscosity=418 poises/23° C.

As determined by gas chromatographic analysis, the commercial dimeric fatty acid employed had the following composition:

monomeric fatty acid =10 percent by weight;
dimeric fatty acid (including "intermediate" between the monomer and dimer peak)=76 percent by weight;
trimeric and higher polymeric fatty acids=14 percent by weight.

TABLE II

| | Dimeric fatty acid alkanolamide according to the invention (percent by weight) | | | Auxiliary agents and additives (percent by weight) | | | | | | | Crude 4,4-diisocyanatodiphenylmethane (percent by weight) | Density (kg./m.³) | Foaming agent |
|---|---|---|---|---|---|---|---|---|---|---|---|---|---|
| | $a_I$ | $a_{II}$ | $a_{III}$ | b | c | d | e | f | g | h | | | |
| Example No.: | | | | | | | | | | | | | |
| 13 | 100 | | | | | | 10 | | 1.0 | 4 | 100 | 73 | $CO_2$ and $CCl_3F$ |
| 14 [1] | 100 | | | | | | 30 | | 1.5 | | 70 | 95 | $CCl_3F$. |
| 15 | 70 | | | | 30 | | 35 | | 1.2 | | 110 | 45 | $CCl_3F$. |
| 16 | 70 | | | 15 | 15 | | 30 | | 1.5 | | 102 | 45 | $CCl_3F$. |
| 17 | 70 | | | 20 | 10 | | 30 | | 1.5 | | 105 | 46 | $CCl_3F$. |
| 18 | 50 | | | 25 | 25 | | 30 | | 1.0 | | 95 | 55 | $CCl_3F$. |
| 19 | | 60 | | | 30 | 10 | 30 | | 1.5 | | 115 | 44 | $CCl_3F$. |
| 20 | 80 | | | | 20 | | 40 | 0.5 | 1.5 | | 100 | 44 | $CCl_3F$. |
| 21 | | | 60 | | 30 | 10 | 35 | | 1.5 | | 55 | 40 | $CCl_3F$. |
| 22 | 100 | | | | | | | | 1.0 | 6 | 115 | 91 | $CO_2$. |
| 23 | 100 | | | | | | | 0.5 | 1.0 | 6 | 115 | 85 | $CO_2$. |

[1] When Example 14 is carried out with a tetrakis-(2-hydroxyethyl) dimer amide purified by washing (hydroxy number, 232; amine number, 29); a stoichiometric reaction gave no usable polyurethane foam.

EXAMPLES 24–28

The foams of Examples 24–28 are prepared from an alkoxylated fatty acid alkanolamide of a monoalkanolamine.

To prepare the alkanolamide, 30.0 kilograms of a commerically available dimeric tall oil fatty acid (acid number=197) and 6.494 kilograms of monoethanolamine (amine number=910) were added to a 75 liter reaction vessel. The mixture was heated in a stream of nitrogen The foams of Examples 24–28, reported in following Table III, were prepared by intensively mixing this propoxylated alkanolamide with the additive materials. Stirring in the isocyanate initiates the reaction. The mixtures were then quickly poured into an open mold.

TABLE III

| | Components (parts by weight) | | | | | | | | Density (kg./m.³) | Compression resistance (kg./cm.²) | Water absorption (vol. percent) |
|---|---|---|---|---|---|---|---|---|---|---|---|
| | a | b | c | d | e | f | g | h | | | |
| Example No.: | | | | | | | | | | | |
| 24 | 50 | 40 | 10 | 25 | 1.0 | 1.0 | 1.0 | 120 | 30 | 2.2 | 3 |
| 25 | 50 | 20 | 30 | 30 | 1.0 | 2.0 | | 110 | 40 | 3.1 | 2.1 |
| 26 | 50 | 30 | 20 | 30 | 1.0 | 1.5 | | 110 | 44 | 3.0 | 3.1 |
| 27 | 60 | | 40 | 45 | 0.7 | 1.5 | | 103 | 27 | 1.9 | 4.5 |
| 28 | 60 | | 40 | 30 | 1.0 | 1.5 | | 103 | 40 | 2.9 | 2 1 |

NOTE.—(a) Propoxylated fatty acid alkanolamide; (b) Commercially available propoxylation product of trimethylolpropane (OH number, 550); (c) N,N,N',N'-tetrakis (2-hydroxypropyl)-ethylenediamine; (d) Trichloromonofluoromethane; (e) N,N'-dimethyl-piperazine (or N-methyl-morpholine); (f) Polysiloxane foamstabilizer; (g) Water; (h) Crude 4,4'-diisocyanato-diphenylmethane.

What is claimed is:

1. A hard foam of a synthetic amide group-containing polyurethane resin formed in the presence of a blowing agent by the reaction of:

(A) an aromatic or araliphatic polyisocyanate, and
(B)(1) a polyhydroxy polyalkanolamide formed by condensing (a) a monoalkanolamine having 2–10 carbon atoms in the alkylene group thereof with (b) a homopolymer of a fatty acid having 10–22 carbon atoms, said homopolymer predominantly comprising dimeric fatty acids together with varying amounts of trimeric and monomeric fatty acids; or
(B)(2) a polyhydroxy polyalkanolamide as in (B)(1) in which up to about 50 percent of the hydroxy groups are alkoxylated with ethylene oxide or propylene oxide.

2. A foam as in claim 1 prepared in the presence of water as a blowing agent, wherein said polyurethane resin additionally comprises urea groups.

3. A foam as in claim 1 formed between components (A) and (B)(1).

4. A foam as in claim 1 formed between components (A) and (B)(2).

References Cited
UNITED STATES PATENTS

| | | | |
|---|---|---|---|
| 3,112,281 | 11/1963 | Gromacki et al. | 260—2.5 |
| 3,251,787 | 5/1966 | Bedoit | 260—2.5 |
| 3,251,788 | 5/1966 | Currier et al. | 260—2.5 |
| 3,267,080 | 8/1966 | Kamal | 260—77.5 |
| 3,346,517 | 10/1967 | Kamal | 260—2.5 |
| 3,061,559 | 10/1962 | Henson et al. | 260—2.5 |

FOREIGN PATENTS

| | | | |
|---|---|---|---|
| 882,949 | 11/1961 | Great Britain | 260—2.5 |

RONALD E. CZAJA, Primary Examiner

H. S. COCKERAM, Assistant Examiner

U.S. Cl. X.R.

260—18, 77.5